United States Patent
Kim et al.

(10) Patent No.: US 8,742,606 B2
(45) Date of Patent: Jun. 3, 2014

(54) POWER CONVERTING DEVICE FOR HYBRID

(75) Inventors: Choon Tack Kim, Seoul (KR); Cheol Gyu Park, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 139 days.

(21) Appl. No.: 13/519,075

(22) PCT Filed: Dec. 22, 2010

(86) PCT No.: PCT/KR2010/009203
§ 371 (c)(1),
(2), (4) Date: Jun. 25, 2012

(87) PCT Pub. No.: WO2011/078575
PCT Pub. Date: Jun. 30, 2011

(65) Prior Publication Data
US 2012/0267902 A1    Oct. 25, 2012

(30) Foreign Application Priority Data
Dec. 24, 2009  (KR) .................. 10-2009-0130341

(51) Int. Cl.
*H02P 9/04* (2006.01)
(52) U.S. Cl.
USPC ..................................... 290/40 C
(58) Field of Classification Search
CPC ..... B60L 11/005; B60L 11/18; B60L 3/0046; B60W 2510/0638; Y02T 10/7022
USPC ..................................... 290/40 C
See application file for complete search history.

(56) References Cited

U.S. PATENT DOCUMENTS

| | | | |
|---|---|---|---|
| 7,042,178 B2 * | 5/2006 | Yamada et al. | 318/376 |
| 7,122,914 B2 * | 10/2006 | Caruthers | 290/40 C |
| 7,176,648 B2 * | 2/2007 | Choi | 318/625 |
| 7,868,569 B2 * | 1/2011 | Iwashita et al. | 318/376 |
| 8,358,031 B2 * | 1/2013 | O'Brien et al. | 307/69 |
| 2002/0030365 A1 * | 3/2002 | Underwood et al. | 290/40 B |

(Continued)

FOREIGN PATENT DOCUMENTS

| | | |
|---|---|---|
| JP | 2002-247711 A | 8/2002 |
| JP | 2004-129463 A | 4/2004 |
| JP | 2006-158173 A | 6/2006 |

(Continued)

OTHER PUBLICATIONS

Search Report dated Sep. 7, 2011 written in Korean for International Application No. PCT/KR2010/009203, filed Dec. 22, 2010, 3 pages.

*Primary Examiner* — Tulsidas C Patel
*Assistant Examiner* — Viet Nguyen
(74) *Attorney, Agent, or Firm* — John D. Veldhuis-Kroeze; Westman, Champlin & Koehler, P.A.

(57) ABSTRACT

The present disclosure prevents an inrush current generated when one side is completely discharged, or charged voltages are different from one another because a DC link capacitor and an ultra-capacitor are directly connected to each other, by driving a load motor after completing initial charging by making each voltage the same through the performing of switching between a DC link capacitor and an ultra-capacitor during initial ignition, so as to safely perform initializing regardless of the charged-discharged state of an electricity storage device during initial ignition.

12 Claims, 5 Drawing Sheets

(56) References Cited

U.S. PATENT DOCUMENTS

2002/0189906 A1* 12/2002 Tominaga et al. ............ 187/290
2010/0039054 A1* 2/2010 Young et al. .................. 318/376
2011/0133547 A1* 6/2011 Song et al. ..................... 307/9.1
2012/0081818 A1* 4/2012 Mazumdar ...................... 361/23

2012/0217824 A1* 8/2012 Gupta et al. .................. 307/145

FOREIGN PATENT DOCUMENTS

JP 2006-314172 A 11/2006
JP 2007-336715 A 12/2007

* cited by examiner

POWER CONVERTING DEVICE FOR HYBRID

This Application is a Section 371 National Stage Application of International Application No. PCT/KR2010/009203, filed Dec. 22, 2010 and published, not in English, as WO2011/078575 on Jun. 30, 2011.

FIELD OF THE DISCLOSURE

The present disclosure relates to a power converting device for a hybrid, and more particularly, to a power converting device for a hybrid capable of safely initializing ignition upon initial startup regardless of the charged or discharged state of an electricity storage device, by preventing an inrush current generated when one of a DC link capacitor and an ultra-capacitor that are directly connected to each other is completely discharged or charge voltages thereof are different.

BACKGROUND OF THE DISCLOSURE

Recently, due to the sudden increase in oil prices, research has been actively conducted on hybrid-type construction machinery having improved fuel efficiency by storing surplus power from an engine in a battery and by supplying power from a battery to make up for insufficient power from an engine.

Such a system that uses both an engine and an electric motor as a source of power and has an electric energy storage device is called a hybrid system. For example, hybrid systems include hybrid systems for hybrid vehicles and heavy machinery such as excavators.

A typical excavator system, uses an engine as a source of power to perform an operation of rotating or propelling a boom, an arm, and a bucket that embody the final load, by means of a medium that is hydraulic pressure. Conversely, a hybrid excavator system additionally includes 2 motors and electricity storage devices installed on a typical excavator, so as to improve the overall efficiency of the excavator system. Main components that are added to a hybrid excavator system include a motor, an electricity storage device, an inverter, and a converter. Here, the electricity storage device includes a battery and an ultra-capacitor.

FIG. 1 is a configurative diagram of a power converting device including a DC-DC converter according to the related art.

Referring to FIG. 1, a power converting device 100 including a DC-DC converter according to the related art includes a switched mode power supply unit 110, a logic control board 120, an engine auxiliary motor inverter 130, a load motor inverter 140, a DC link capacitor 150, and an ultra-capacitor converter 160 that is a DC-DC converter. Here, the switched mode power supply unit 110, the logic control board 120, the engine auxiliary motor inverter 130, the load motor inverter 140, and the ultra-capacitor converter 160 are connected to a battery 101 for a control board, an excavator electric device 102, an engine auxiliary motor 103, a load motor 104, and an ultra-capacitor 105, respectively.

The switched mode power supply (SMPS) 110 is connected to the battery 101 for a control board and supplies power to the logic control board 120.

The logic control board 120 senses the power of the ultra-capacitor 105 and the power of the DC link capacitor, and performs the function of controlling an initial driving logic.

The engine auxiliary motor inverter 130 performs the function of charging the DC link capacitor 150 through the engine auxiliary motor 103. Here, the engine auxiliary motor 103 is directly connected to an engine, and rotates at the same rpm as the engine during engine operation.

When a power contactor of the ultra-capacitor 105 is turned ON, the load motor inverter 140 performs the function of driving the load motor 104 according to a charged voltage. Here, the load motor 104 supplies the power required by driven components that may be used for electric power, from among the driven components for the tasks of the excavator.

The DC link capacitor 150 charges a DC voltage converted by the engine auxiliary motor inverter 130. The DC link capacitor 150 is connected to the ultra-capacitor converter 160.

The ultra-capacitor converter 160 uses the electric energy stored in the DC link capacitor 150 to perform the function of charging the ultra-capacitor 105. The ultra-capacitor converter 160 is connected between the DC link capacitor 150 and the ultra-capacitor 105. Here, the ultra-capacitor 105 is charged by a voltage converted by the ultra-capacitor converter 160.

The power converting device 100 including a DC-DC converter configured as above includes an inverter (for example, the engine auxiliary motor inverter 130 and the load motor inverter 140) for driving a motor, and a converter (for example, the ultra-capacitor converter 160) for driving an ultra-capacitor. Here, the process of converting a voltage of the DC link to charge the ultra-capacitor 105 by the ultra-capacitor converter 160 is accompanied by operational loss. Without such a converter, the power converting device 100 may have many benefits.

First, compared to a power converting device having a DC-DC converter according to the related art, a converterless power converting device may improve system efficiency. This is because the loss generated from the ultra-capacitor 160 is absent.

Second, the size of the power converting device 100 may be reduced. The power converting device does not require an inductor for a DC-DC converter, an insulated gate bipolar transistor (IGBT) capable of high-speed switching, and a current transformer (CT) for current measurement. Thus, because the space occupied by the inductor for a converter, the IGBT, and the CT is absent, the size of the power converting device 100 may be reduced.

Third, the cost for manufacturing the power converting device 100 may be reduced. The power converting device 100 may be manufactured as a structure without the inductor for a converter, the IGBT, and the CT.

Accordingly, when a converter is not used and an electric energy storage device such as the ultra-capacitor 105 is used, the power switching device 100 in the related art is advantageous in that loss may be reduced.

However, when the DC link capacitor 150 and the ultra-capacitor 105 are directly connected to each other, a dangerous inrush current may be generated when the ultra-capacitor converter 160 is discharged or the ultra-capacitor 105 must be charged due to a large voltage difference with the DC link. When the current converting device 100 initializes ignition, if one side is completely discharged or the charged voltages are mutually different, this inrush current may be generated when the voltage of the ultra-capacitor 105 is low while the ultra-capacitor 105 is being charged through energy recovery. That is, when the DC-DC converter is simply excluded from a power converting device 100 in the related art, there arises the problem where components may be damaged by an inrush current during initial ignition or charging of the ultra-capacitor 105. Accordingly, the development of a technology for resolving the issue of such an inrush current is urgently required.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Accordingly, the present disclosure has been devised to solve the above problems and provide a power converting device for a hybrid which facilitates the miniaturization of the power converting device and the reduction of manufacturing costs, and is capable of preventing damage from an inrush current during the charging of an ultra-capacitor.

In order to achieve the above object, the present disclosure provides a power converting device for use with a hybrid excavator, comprising: a first electric energy accumulating unit disposed between a first inverter connected to an engine auxiliary motor and a second inverter connected to a load motor, and accumulating electric energy generated by the engine auxiliary motor; a second electric energy accumulating unit configured to accumulate the electric energy accumulated by the first electric energy accumulating unit, the electric energy generated by the engine auxiliary motor, and electric energy generated through a generating operation of the load motor; an initial charging unit disposed between the first electric energy accumulating unit and the second electric energy accumulating unit, and configured to charge the electric energy accumulated in the first electric energy accumulating unit to the second electric energy accumulating unit; a switching unit configured to switch a connection between the initial charging unit and the second electric energy accumulating unit, and a connection between the second electric energy accumulating unit and the load motor, respectively; and an initial charging control unit configured to make first and second accumulated voltages sensed at the first and second electric energy accumulating units, respectively, the same during initial ignition, and to control the switching unit to connect the load motor and the second electric energy accumulating unit.

In order to achieve the above object, the present invention provides a method of operating a power converting device for use with a hybrid excavator, the method comprising: supplying power to an initial charging control unit; sensing a voltage of a first electric storage unit disposed between an engine auxiliary motor and a load motor and a voltage of a second electric storage unit that is charged with electric power generated by at least one of the engine auxiliary motor and a load motor; making the voltage of the first electric storage unit and the voltage of the second electric storage unit the same during initial ignition; charging the second electric storage unit through a switching unit for high current conduction disposed between the first electric storage unit and the second electric storage unit; wherein the second electric storage unit is charged from the first electric storage unit through a switching unit for low current conduction during initial ignition.

According to the present disclosure, because a DC link capacitor and an ultra-capacitor are directly connected to each other, by driving a load motor after the voltages of the DC link capacitor and the ultra-capacitor are made the same during initial ignition, in order to prevent an inrush current generated when one side is completely discharged or charged voltages are different from one another, the effect may be realized of safely performing initializing regardless of the charged-discharged state of an electricity storage device during initial ignition.

That is, the present disclosure provides the effect of not using a converter and preventing an inrush current generated when one side is completely discharged or charged voltages are different from one another because a DC link capacitor and an ultra-capacitor are directly connected to each other, and of safely performing initializing regardless of whether an electricity storage device is charged or discharged during initial ignition.

Also, the present disclosure provides the effect of reducing the overall size of a power converting device because the device does not require an inductor for a DC-DC converter, an IGBT, and a CT.

Further, the present disclosure provides the effect of reducing the costs arising from the provision of a converter.

DETAILED DESCRIPTION

Figure 1:
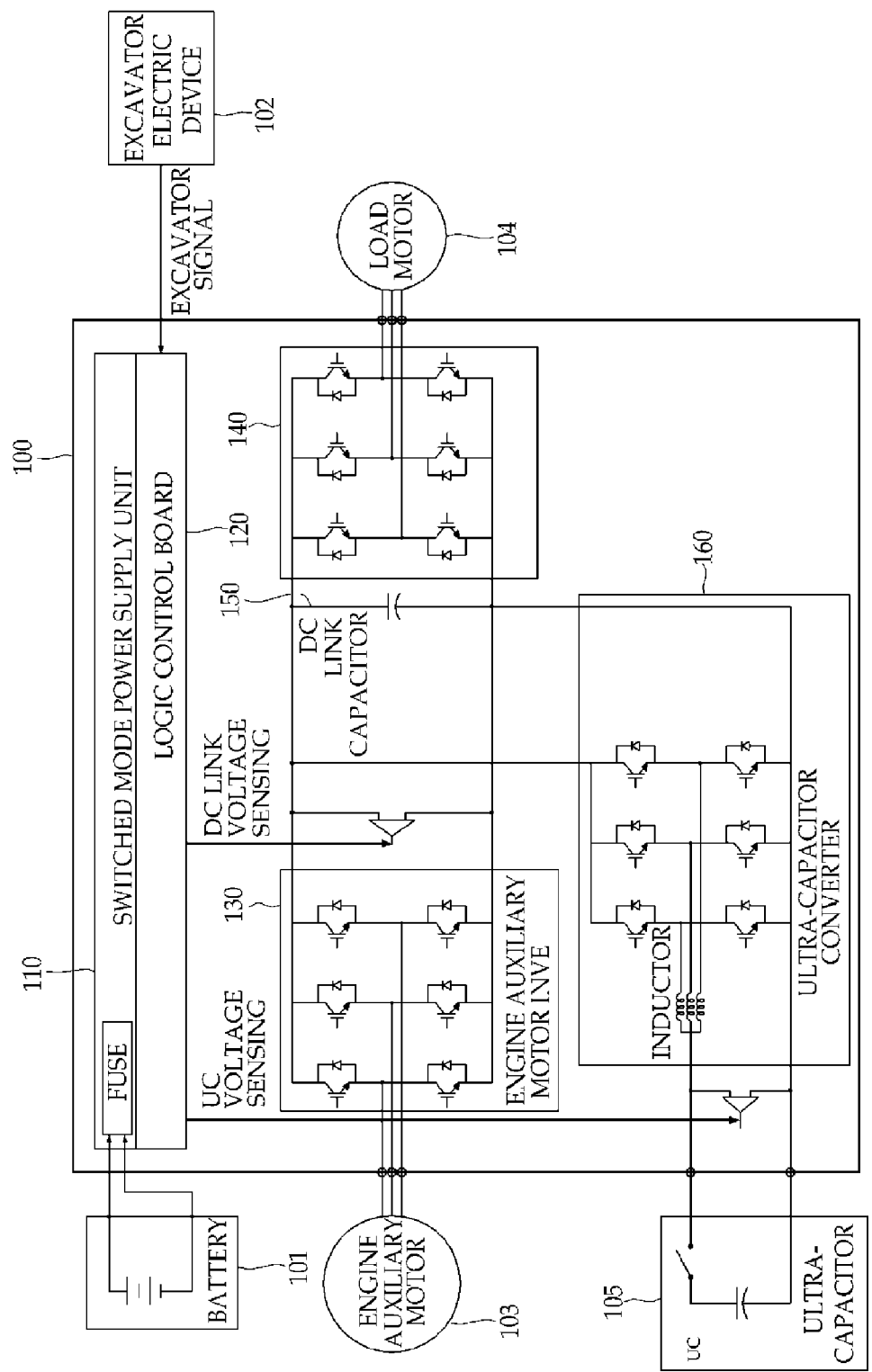
FIG. 1 is a configurative diagram of a power converting device including a DC-DC converter according to the related art.

Hereinafter, exemplary embodiments of the present disclosure will be described in detail with reference to the accompanying drawings. The structure of the present disclosure and the effects thereof will be clearly understood from the detailed description below. It should be noted that the same components refer to the same reference numerals even when illustrated in other drawings. Further, in describing the present disclosure, when it is determined that detailed description relating to well-known functions or configurations may make the subject matter of the present disclosure unnecessarily ambiguous, the detailed description will be omitted.

Figure 2:
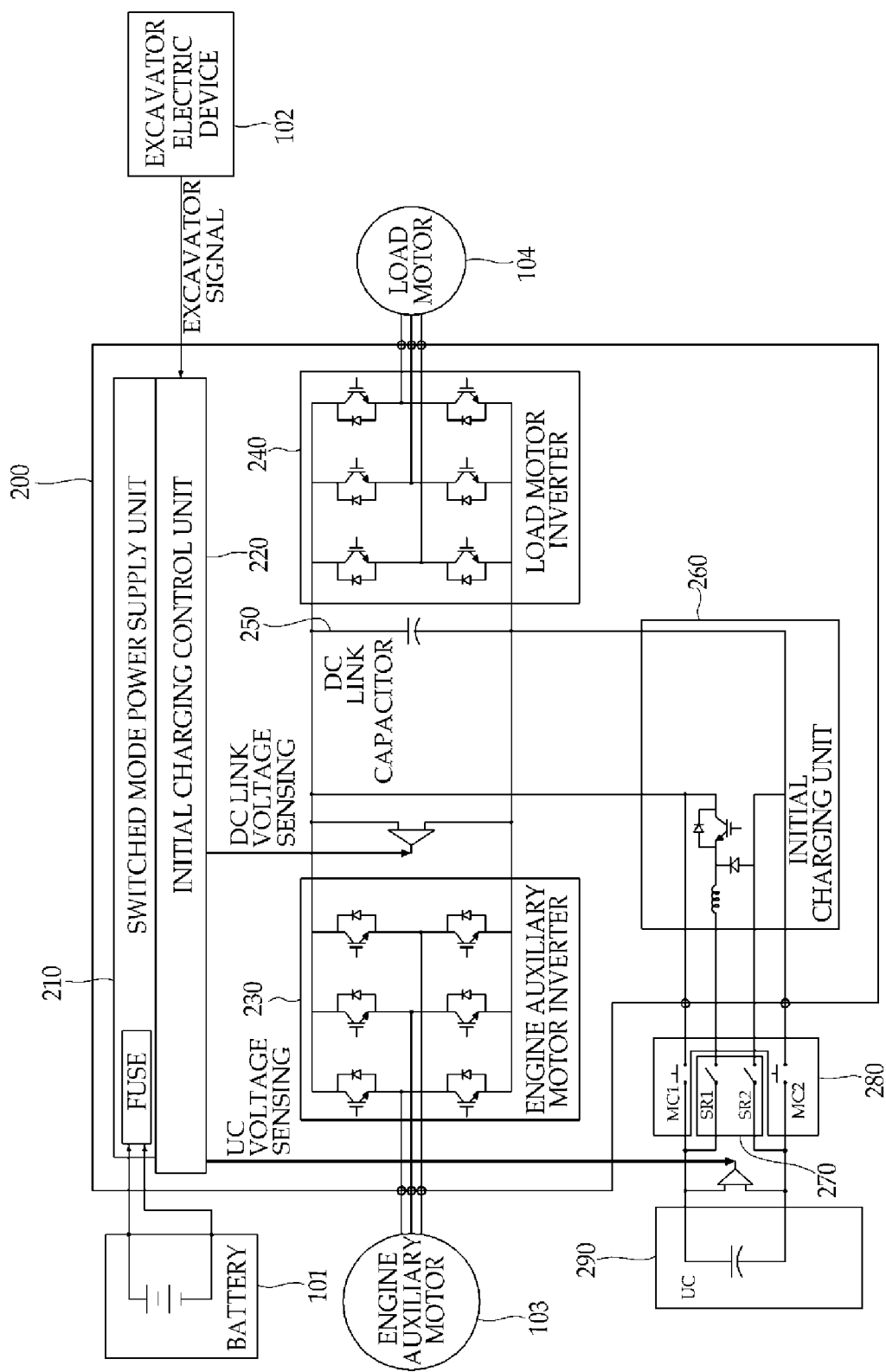
FIG. 2 is a configurative diagram of a power converting device for a hybrid according to an exemplary embodiment of the present disclosure.

FIG. 2 is a configurative diagram of a power converting device for a hybrid according to an exemplary embodiment of the present disclosure.

Referring to FIG. 2, a DC-DC converterless power converting device 200 according to an exemplary embodiment of the present disclosure includes an initial charging control unit 220 that receives power through a switched mode power supply unit 210, an engine auxiliary motor inverter 230, a load motor inverter 240, a DC (Direct Current) link capacitor 250, an initial charging unit 260, small-capacity relays (SR1 and SR2) 270 for initial charging, and high-capacity contactors (MC1 and MC2) 280 for high current conduction. An ultra-capacitor 290 is connected to the power converting device 200 through the small-capacity relays (SR1 and SR2) 270 for initial charging and the high-capacity contactors (MC1 and MC2) 280 for high current conduction. Here, the switched mode power supply unit 210, the initial charging control unit 220, the engine auxiliary motor inverter 230, and the load motor inverter 240 are connected to a battery 101, an excavator electric device 102, an engine auxiliary motor 103, and a load motor 104, respectively. The small-capacity relays (SR1 and SR2) 270 for initial charging may be included in the ultra-capacitor 290. FIG. 2 illustrates one example of a load motor that provides rotating driving power for equipment, in the form of the load motor 104 driven by using electricity accumulated in the ultra-capacitor 290. However, the present disclosure is not necessarily limited thereto, and may apply any motor that may use electricity accumulated in the ultra-capacitor, from among motors that are connected to a device (a pump for providing hydraulic pressure, in the case of an excavator) that provides power to various work tools installed on equipment. Here, in the case of a motor that functions as a generator by being driven in reverse through the inertia of a work tool, the generated electricity may be charged in the ultra-capacitor by passing through a DC link.

Below, a description of each constituent element of the DC-DC converterless power converting device 200 and the ultra-capacitor 290 will be provided.

A switched-mode power supply (SMPS) 210 is connected to the battery 101 for a control board and supplies power to the initial charging control unit 220.

The initial charging control unit 220 senses the voltage of the ultra-capacitor 290 and the voltage of the DC link capacitor 250, and performs the function of controlling an initial driving logic. That is, the initial charging control unit 220, controls the small-capacity relays (SR1 and SR2) 270 for initial charging and the high-capacity contactors (MC1 and MC2) 280 for high current conduction, to make the voltage of the DC link capacitor 250 and the voltage of the ultra-capacitor 290 the same during initial ignition according to [Table 1] and FIG. 4 below, in order to prevent an inrush current from occurring between the DC link capacitor 250 and the ultra-capacitor 290.

The engine auxiliary motor inverter 230 performs the function of charging the DC link capacitor 250 by means of the engine auxiliary motor 103. Here, the engine auxiliary motor 103 is directly connected to the engine, and rotates at the same rpm as the engine during initial ignition.

The load motor inverter 240 drives the load motor 104 according to a charged voltage, when the high-capacity contactors (MC1 and MC2) 280 of the ultra-capacitor 290 are in an ON state.

The DC link capacitor 250 charges a DC voltage converted by the engine auxiliary motor inverter 230. The DC link capacitor 250 is connected to the initial charging unit 260.

The initial charging unit 260 charges the ultra-capacitor 290. The initial charging unit 260 is connected between the DC link capacitor 250 and the ultra-capacitor 290. Here, the ultra-capacitor 290 is charged by a voltage converted by the initial charging unit 260. Preferably, the initial charging unit 260 may be formed as a small-capacity DC-DC converter for initial charging.

The ultra-capacitor 290 is connected to the DC link capacitor 250, and the initial charging unit 260 is disposed therebetween. The voltage of the ultra-capacitor 290 and the voltage of the DC link capacitor 250 are made the same according to the operation of the small-capacity relays (SR1 and SR2) 270 for initial charging by the ultra-capacitor 290 and the high-capacity contactors (MC1 and MC2) 280 for high current conduction, controlled by the initial charging control unit 220.

The small-capacity relays (SR1 and SR2) 270 for initial charging perform the function of relaying the voltage of the DC link capacitor 250 converted through the initial charging unit 260 to the ultra-capacitor 290 or blocking the voltage, according to the controlling by the initial charging control unit 220.

The high-capacity contactors (MC1 and MC2) 280 for high current conduction are maintained in an OFF state during initial ignition, and are switched to an ON state to relay the voltage charged in the ultra-capacitor 290 to the load motor 104 through the load motor inverter 240, when the voltage of the DC link capacitor 250 and the voltage of the ultra-capacitor 290 are made the same by the controlling of the initial charging control unit 220.

Hereinafter, to provide a detailed description below of the control process by the initial charging control unit 220 during initial ignition with reference to [Table 1], the converterless power converting device 200 according to the present disclosure includes two electric energy storage devices, which are the DC link capacitor 250 and the ultra-capacitor 290. In order to prevent the occurrence of an inrush current between the two electric energy storage devices, the DC link capacitor 250 and the ultra-capacitor 290 are sequentially initialized according to the charged and discharged states thereof.

First, the initial charging control unit 220 senses the voltage of the DC link capacitor 250 and the voltage of the ultra-capacitor 290. The initial charging control unit 220 categorizes the charged states of the DC link capacitor 250 and the ultra-capacitor 290 according to a sensed voltage in [Table 1] below. That is, the initial charging control unit 220 determines the voltage states of the DC link capacitor 250 and the ultra-capacitor 290.

TABLE 1

| | DC link | |
|---|---|---|
| UC Voltage | 0 V to Reference Voltage | Reference Voltage to Maximum Voltage |
| 0 V to Reference Voltage | DC link: Natural Charging to Reference Voltage UC: Charge to Reference Voltage | DC link: Voltage Control to Reference Voltage UC: Charge to Reference Voltage |
| Reference Voltage to Maximum Voltage | DC link: Voltage Control to UC Voltage UC: No Control | DC link: Voltage Control to UC Voltage UC: No Control |

Here, the reference voltage represents the output voltage of the engine auxiliary motor 103 during initial engine ignition. In [Table 1], the charged states of the DC link capacitor 250 and the ultra-capacitor 290 may be divided into four categories.

First, when the voltage of the DC link capacitor 250 is between 0 V and a reference voltage and the voltage of the ultra-capacitor 290 is between 0 V and the reference voltage, the initial charging control unit 220 naturally charges the DC link capacitor 250 to the reference voltage. Also, the initial charging control unit 220 maintains the small-capacity relays (SR1 and SR2) 270 ON and charges the ultra-capacitor 290 to the reference voltage which is the voltage of the DC link capacitor 250.

Second, when the voltage of the DC link capacitor 250 is between the reference voltage and a maximum voltage and the voltage of the ultra-capacitor 290 is between 0 V and the reference voltage, the initial charging control unit 220 controls the voltage of the DC link capacitor 250 to the reference voltage. That is, when the voltage of the DC link capacitor 250 is greater than the reference voltage, the initial charging control unit 220 controls the small-capacity relays (SR1 and SR2) 270 to lower the voltage of the DC link capacitor 250. Also, the initial charging control unit 220 maintains the small-capacity relays (SR1 and SR2) 270 in an ON state to charge the ultra-capacitor 290 to the reference voltage.

Third, when the voltage of the DC link capacitor 250 is between the reference voltage and the maximum voltage and the voltage of the ultra-capacitor 290 is between 0 V and the reference voltage, the initial charging control unit 220 controls a voltage to match the voltage of the DC link capacitor 250 to the voltage of the ultra-capacitor 290. Here, the initial charging control unit 220 does not control the voltage of the ultra-capacitor 290.

Fourth, when the voltage of the DC link capacitor 250 is between the reference voltage and the maximum voltage and the voltage of the ultra-capacitor 290 is between the reference voltage and the maximum voltage, the initial charging control unit 220 controls a voltage to match the voltage of the DC link capacitor 250 to the voltage of the ultra-capacitor 290. Here, the initial charging control unit 220 does not control the voltage of the ultra-capacitor 290.

According to [Table 1], the initial charging control unit 220 controls a voltage to match the voltage of the DC link capacitor 250 to the voltage of the ultra-capacitor 290. That is, the initial charging control unit 220 determines at which side of the reference voltage the voltage of the DC link capacitor 250 and the voltage of the ultra-capacitor 290 lie, and controls the voltage of the DC link capacitor 250 or the ultra-capacitor 290.

This voltage control process is constituted by a charging mode for the DC link capacitor 250 and a charging mode for the ultra-capacitor 290. In the charging mode for the DC link capacitor 250, the small-capacity relays 270 and the high-capacity contactors 280 are maintained in an OFF state. The voltage of the DC link capacitor 250 is charged through the engine auxiliary motor inverter 230. Conversely, in the charging mode for the ultra-capacitor 290, the small-capacity relays 270 are maintained in an ON state, and the high-capacity contactors 280 are maintained in an OFF state. The voltage of the ultra-capacitor 290 is charged through the initial charging unit 260.

Figure 3A:
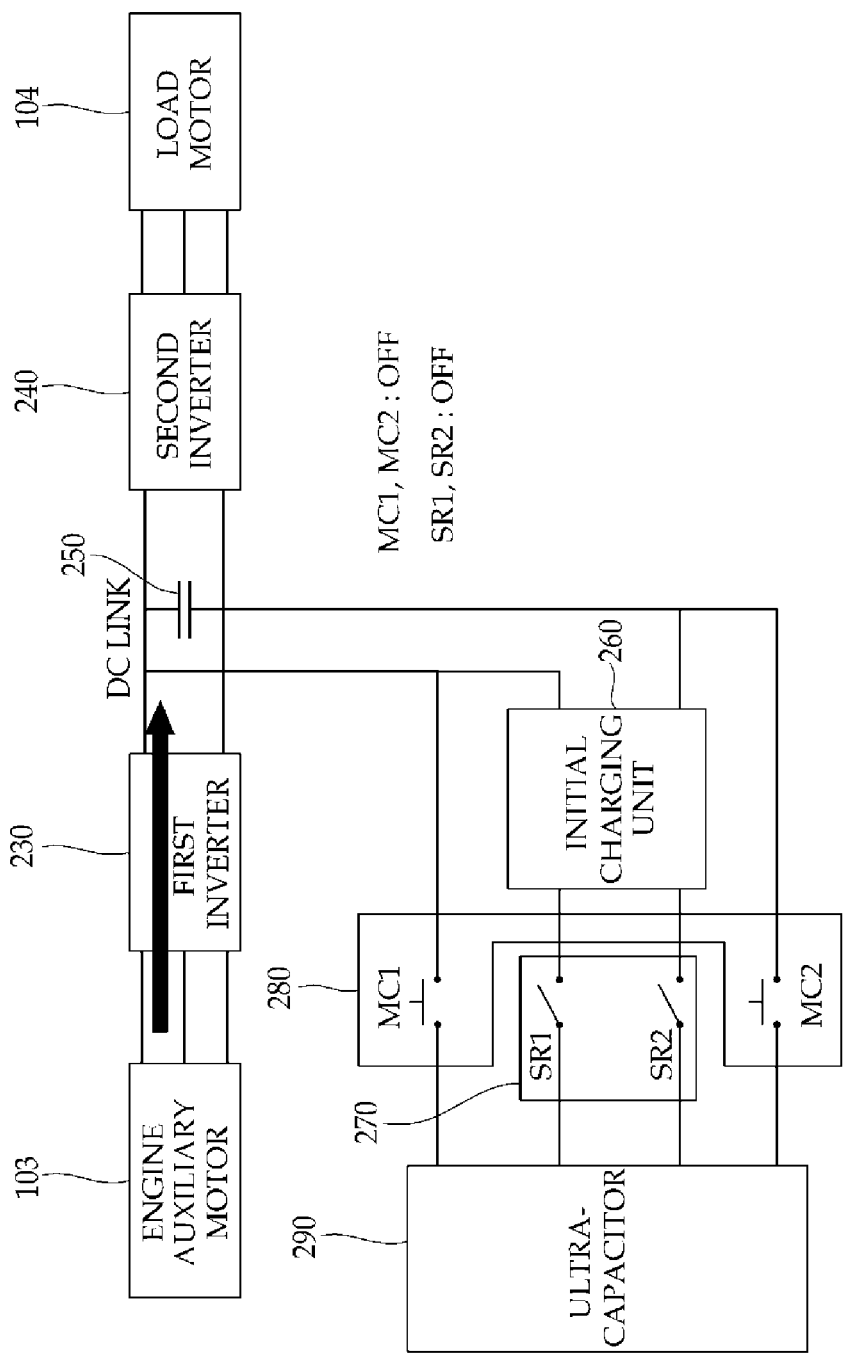
FIGS. 3A and 3B are diagrams illustrating an initial charging operation in a DC link charging mode and a UC charging mode, according to exemplary embodiments of the present disclosure.
Figure 3B:
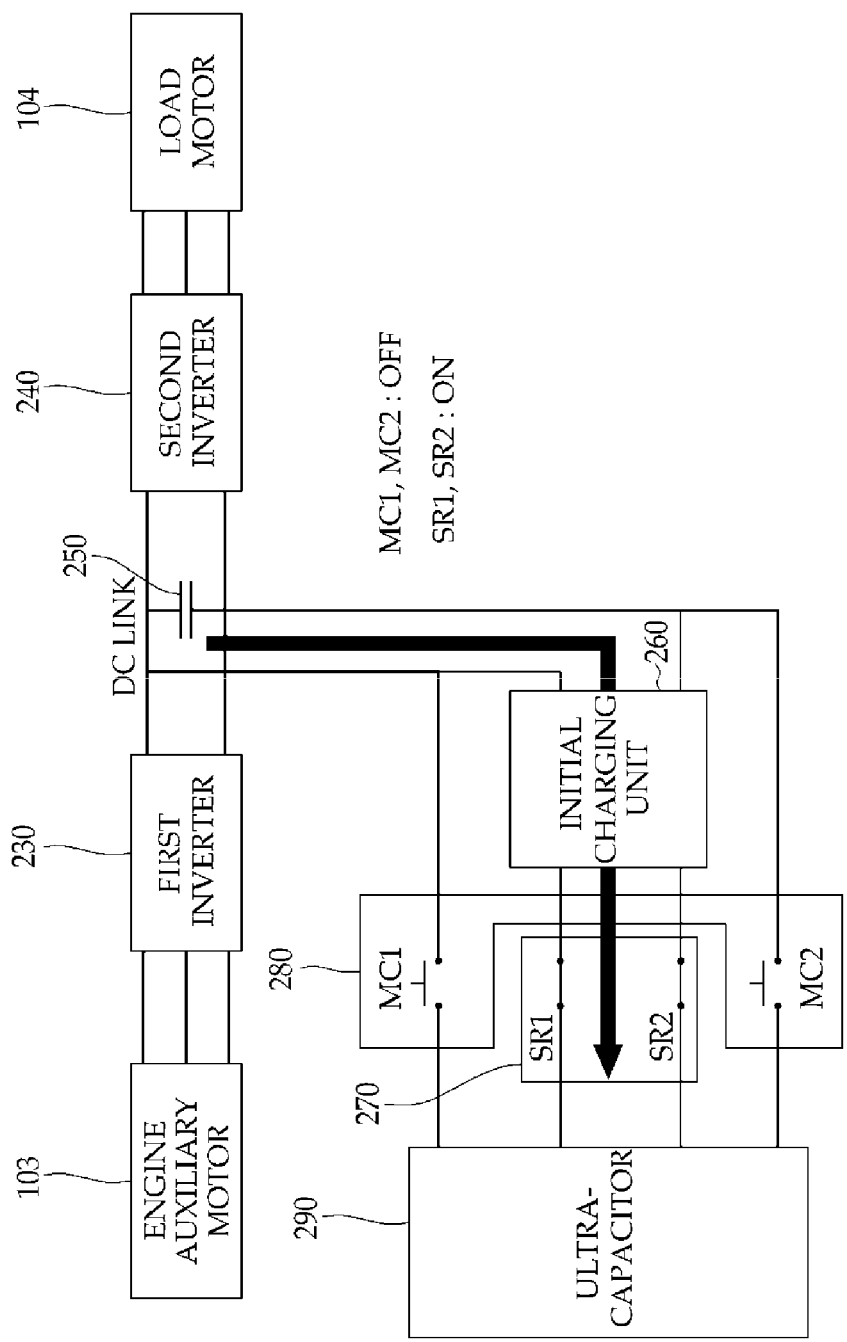

FIGS. 3A and 3B are diagrams illustrating an initial charging operation in a DC link charging mode and a UC charging mode, according to exemplary embodiments of the present disclosure.

The DC link charging mode and the UC charging mode according to the present disclosure will be distinguished from each other when described.

First, in the charging mode of the DC link capacitor 250, the engine auxiliary motor 103 automatically performs a generating operation as the engine rotates at an initial rpm during initial ignition, and generates a voltage corresponding to the initial rpm. Here, when the voltage of the DC link capacitor 250 is less than the generated voltage, a diode built into a power device of the engine auxiliary motor inverter (hereinafter called a "first inverter") 230 is naturally put in a state of conduction by this voltage difference. Then, a voltage equal to the generated voltage is charged in the capacitor of the DC link capacitor 250. Here, the engine acts as an important element when rotating at the initial rpm during initial ignition. In the DC link charging mode, the small-capacity relays (SR1 and SR2) 270 and the high-capacity contactors (MC1 and MC2) 280 for high current conduction are maintained in an OFF state.

Second, to describe the charging mode of the ultra-capacitor 290, the small-capacity relays (SR1 and SR2) 270 maintained in an OFF state in the charging mode of the DC link capacitor 250 are switched to an ON state, and the high-capacity contactors (MC1 and MC2) 280 for high current conduction are maintained in the OFF state. Then, the DC link capacitor 250 charged in the charging mode of the DC link capacitor 250 charges the ultra-capacitor 290 through the initial charging unit 260 and the small-capacity relays (SR1 and SR2) 270 switched to an ON state. Here, the high-capacity contactors (MC1 and MC2) 280 for high current conduction are maintained in the OFF state.

That is, the DC link capacitor 250 is charged through the first inverter 230, and the ultra-capacitor 290 is charged through the DC link capacitor 250, the initial charging unit 260, and the small-capacity relays (SR1 and SR2) 270.

Next, when the charging of the DC link capacitor 250 and the ultra-capacitor 290 is completed, the initial charging control unit 220 switches the high-capacity contactors (MC1 and MC2) 280 for high current conduction to an ON state and completes the initial charging process.

Figure 4:
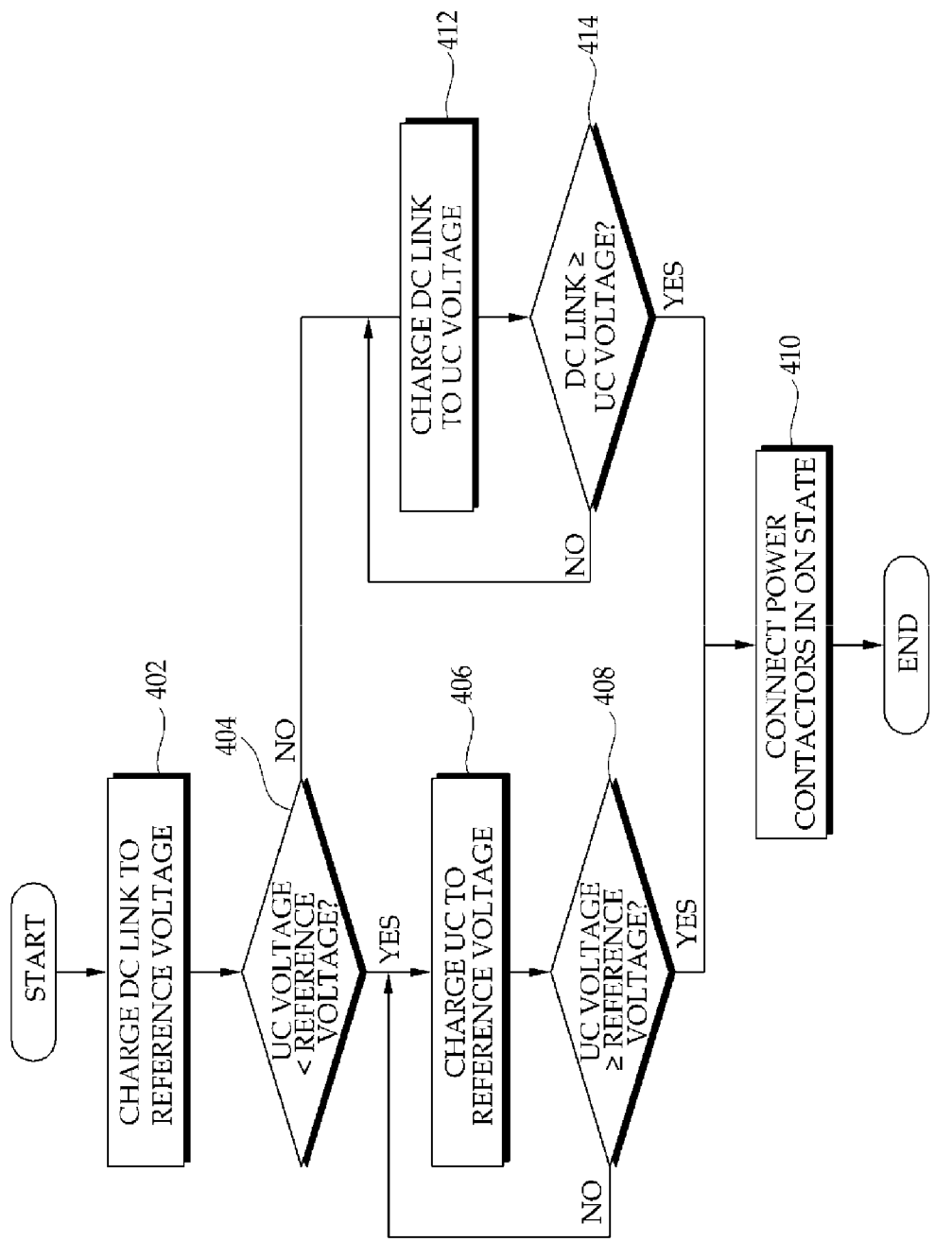
FIG. 4 is a flowchart of an initial charging method for a DC link and an ultra-capacitor according to an exemplary embodiment of the present disclosure.

FIG. 4 is a flowchart of an initial charging method for a DC link and an ultra-capacitor according to an exemplary embodiment of the present disclosure.

As a driver performs a Key On operation of the excavator electric device 102, the engine rotates at an initial rpm during initial ignition. Then, according to the rotation of the engine at the initial rpm during the initial ignition, the engine auxiliary motor 103 automatically performs a generating operation and generates a voltage corresponding to the initial rpm. Here, when the voltage of the DC link capacitor 250 is less than the generated voltage, the voltage difference naturally causes the diode built into the power device of the first inverter 230 to be put into a state of conduction. Then, the capacitor of the DC link capacitor 250 is charged to as much as the generated voltage 402. Here, a reference voltage represents a charging voltage according to an engine idle speed during initial ignition.

The initial charging control unit 220 determines whether a voltage of the ultra-capacitor 290 sensed from the ultra-capacitor 290 is less than the reference voltage (step 404).

When the determined results (step 404) show that the voltage of the ultra-capacitor 290 is less than the reference voltage, the initial charging control unit 220 charges the voltage of the ultra-capacitor 290 to the reference voltage (step 406).

Also, the initial charging control unit 220 determines whether the voltage of the ultra-capacitor 290 is greater than the reference voltage (step 408).

When the determined results (step 408) show that the voltage of the ultra-capacitor 290 is greater than the reference voltage, the initial charging control unit 220 connects the high-capacity contactors 280 in an ON state (step 410). Conversely, when the voltage of the ultra-capacitor 290 is less than the reference voltage, the initial charging control unit 220 performs the steps from 406 onward again where the ultra-capacitor 290 is charged to the reference voltage.

Meanwhile, when the determined results (step 404) show that the voltage of the ultra-capacitor 290 is greater than the reference voltage, the initial charging control unit 220 charges the DC link capacitor 250 to match the voltage thereof to the voltage of the ultra-capacitor 290 (step 412).

In addition, the initial charging control unit 220 determines whether the voltage of the DC link capacitor 250 is greater than the voltage of the ultra-capacitor 290 (step 414).

When the determined results (step 414) show that the voltage of the DC link capacitor 250 is greater than the voltage of the ultra-capacitor 290, the initial charging control unit 220 performs step 410 of connecting the high-capacity contactors 280 in an ON state. Conversely, when the voltage of the DC link capacitor 250 is less than the voltage of the ultra-capacitor 290, the initial charging control unit 220 performs steps 412 onward again where the voltage of the DC link capacitor 250 is charged to be matched to the voltage of the ultra-capacitor 290.

As described above, although certain exemplary embodiments of the present disclosure have been described in detail, it is to be understood by those skilled in the art that the spirit and scope of the present disclosure are not limited to the certain exemplary embodiments, but are intended to cover various modifications and changes without departing from the subject matter of the present disclosure. The scope of the present disclosure shall be defined by the scope of the appended claims, and should be understood to include all technology within a similar scope.

The present disclosure can safely perform initializing regardless of the charged-discharged state of an electricity storage device during initial ignition by preventing an inrush current generated when one side of a DC link capacitor and an ultra-capacitor is completely discharged, or charged voltages are different from one another, so as to revitalize the current power converting device industry.

The invention claimed is:

1. A power converting device for a hybrid, comprising:
    a first accumulating unit disposed between a first inverter connected to an engine auxiliary motor and a second inverter connected to a load motor, and accumulating electric energy generated by the engine auxiliary motor;
    a second accumulating unit configured to accumulate the electric energy accumulated by the first accumulating unit, the electric energy generated by the engine auxiliary motor, and electric energy generated through a generating operation of the load motor;
    an initial charging unit disposed between the first accumulating unit and the second accumulating unit, and configured to charge the electric energy accumulated in the first accumulating unit to the second accumulating unit;
    a switching unit configured to switch a connection between the initial charging unit and the second accumulating unit, and a connection between the second accumulating unit and the load motor, respectively; and
    an initial charging control unit configured to make first and second accumulated voltages sensed at the first and second accumulating unit, respectively, the same during initial ignition, and to control the switching unit to connect the load motor and the second accumulating unit.

2. The power converting device for a hybrid of claim 1, wherein the switching unit comprises:
    a first switching unit configured to switch a connection between the initial charging unit and the second accumulating unit to charge the second accumulating unit; and
    a second switching unit configured to switch the connection between the second accumulating unit and the load motor to drive the load motor.

3. The power converting device for a hybrid of claim 1, wherein the initial charging control unit compares the sensed first and second accumulated voltages to a predetermined charged voltage at an engine idle speed during initial ignition, and matches the sensed first and second accumulated voltages to each other according to results of the comparison of the sensed first and second voltages.

4. The power converting device for a hybrid of claim 3, wherein when the sensed second voltage is less than the predetermined charged voltage according to the results of the comparison of the sensed first and second voltages, the initial charging control unit uses the second switching unit to charge the second accumulating unit to the predetermined charged voltage, and when the sensed second voltage is greater than the predetermined charged voltage, the initial charging control unit charges the first accumulating unit to the sensed second voltage.

5. The power converting device for a hybrid of claim 3, wherein the initial charging control unit controls the voltages of the first and second accumulating units to the predetermined charged voltage or the sensed second voltage, according to the results of the comparison of the sensed first and second voltages.

6. The power converting device for a hybrid of claim 3, wherein the initial charging control unit uses the second switching unit to charge the second accumulating unit to the sensed first voltage or the predetermined voltage, according to the results of the comparison of the sensed first and second voltages.

7. A method of operating a power converting device for use with a hybrid excavator, the method comprising:
    supplying power to an initial charging control unit;
    sensing a voltage of a first electric storage unit disposed between an engine auxiliary motor and a load motor and a voltage of a second electric storage unit that is charged with electric power generated by at least one of the engine auxiliary motor and a load motor;
    making the voltage of the first electric storage and the voltage of the second electric storage unit the same during initial ignition; and
    charging the second electric storage unit through a switching unit for high current conduction disposed between the first electric storage unit and the second electric storage unit;
    wherein the second electric storage unit is charged from the first electric storage unit through a switching unit for low current conduction during initial ignition.

8. The method of claim 7, wherein the switching unit for high current conduction is in an off state during initial ignition.

9. The method of claim 7, wherein the switching unit for high current conduction and the switching unit for low current conduction is in an off state when the first electric storage unit is charging during initial ignition.

10. The method of claim 7, wherein the switching unit for low current conduction is in an off state and the switching unit for high current conduction is in an on state when the second electric storage unit is charging during initial ignition.

11. The method of claim 7, wherein the switching unit for low current conduction and the switching unit for high current conduction are controlled by an initial charging unit.

12. The method of claim 7, wherein the first electric storage unit is a DC link capacitor and the second electric storage unit is a ultra-capacitor.

* * * * *